Patented Mar. 19, 1929.

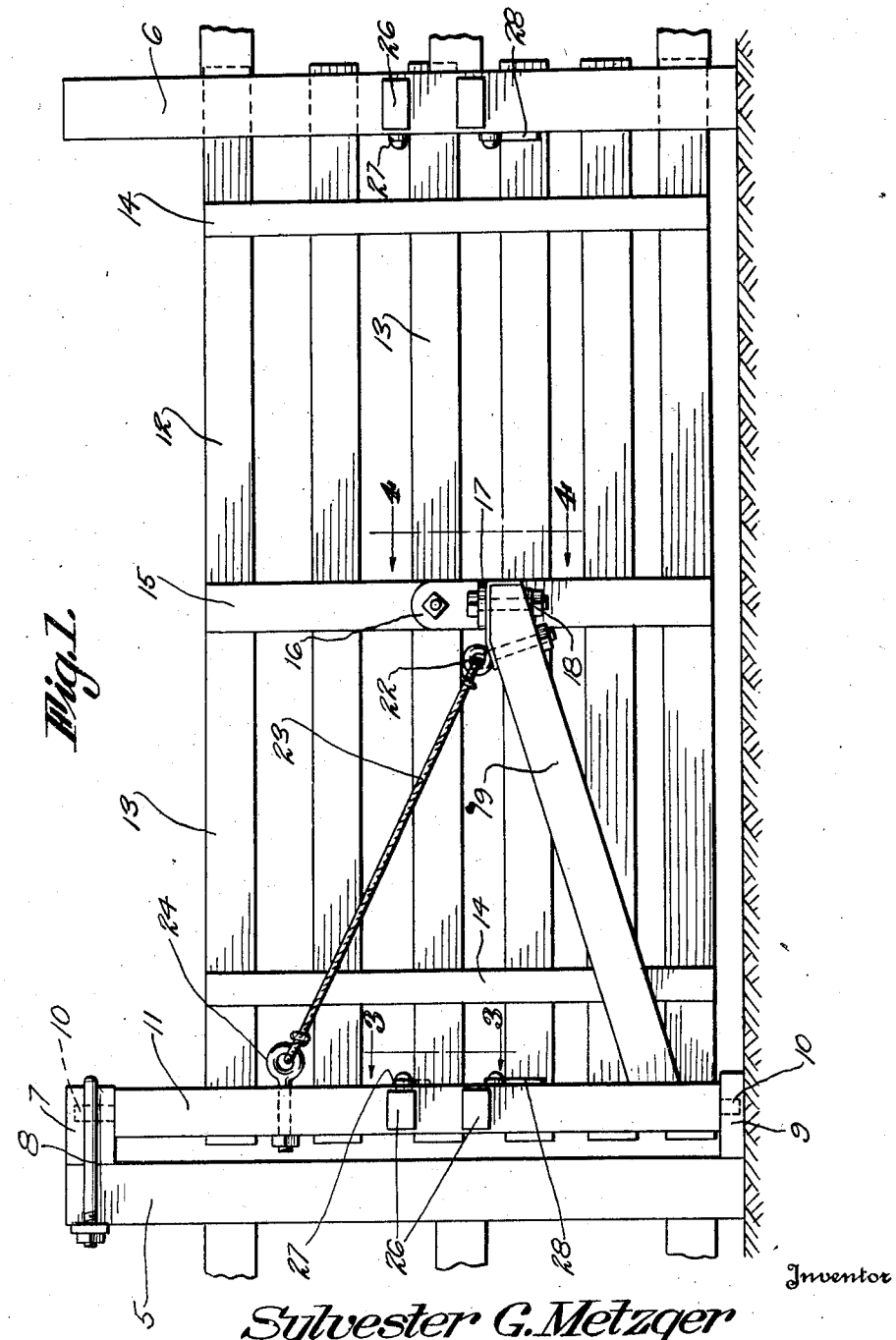

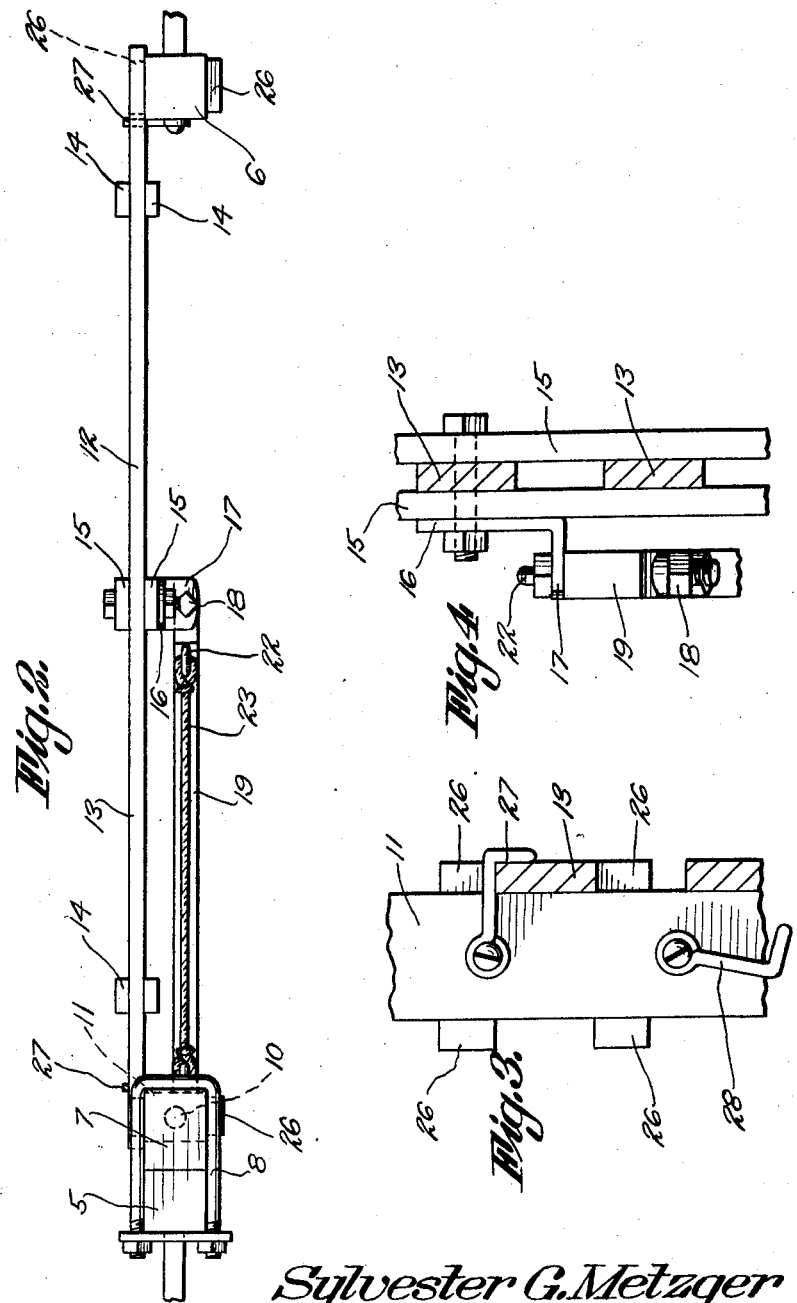

1,705,990

UNITED STATES PATENT OFFICE.

SYLVESTER G. METZGER, OF DELPHOS, OHIO.

GATE.

Application filed July 21, 1927. Serial No. 207,475.

This invention has reference to gates, and more particularly gates especially designed for farm use, the primary object of the invention being to provide a reversible gate which may be moved to cause the same to swing in either direction, so that the gate may be braced by the gate posts against stock rubbing or pressing against the gate.

Another object of the invention is to provide a gate of this character having means for lifting the gate to adjust the gate and support the gate against sagging.

A still further object of the invention is to provide a gate which may be inverted so that a space may be provided at the bottom of the gate to permit small animals to pass thereunder, but exclude larger animals.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view illustrating a gate constructed in accordance with the invention.

Figure 2 is a plan view thereof.

Figure 3 is a sectional view on line 3—3 of Figure 1.

Figure 4 is a sectional view taken on line 4—4 of Figure 1.

Referring to the drawings in detail, the reference character 5 indicates a gate post at one end of a gate opening and the reference character 6 indicates the gate post at the opposite end of the gate opening.

At the upper end of the gate post 5 is a bearing member 7 held to the gate post by means of the U-shaped securing member 8. At the lower end of the gate post 5 is a bearing member 9 which may be formed of concrete, metal or other suitable material, the bearings 7 and 9 being provided with openings to accommodate the pintless 10 at the upper and lower ends of the gate bar 11.

The gate proper is indicated generally by the reference character 12 and includes a plurality of horizontal spaced bars 13 secured together by means of the vertical bars 14 and a central bar 15, the bars 14 being arranged in spaced relation with the ends of the gate proper, so that portions of the bars 13 extend to positions to contact with the bars 6 and 11.

Secured to the central bar 15 is a bracket member 16 which is provided with a laterally disposed ear 17 formed with an opening to receive the pivot bolt 18 that passes through the upper end of the supporting bar 19. This supporting bar 19 is secured to the bar 11, near the lower end thereof.

Extending through the bar 19 at a point adjacent to the upper end thereof is an eye bolt 22 to which the member 23 is connected.

The upper end of the member 23 is secured to the eye bolt 24, which may be adjusted by means of the nut 25 to the end that the member 23 may be adjusted to compensate for sagging of the gate.

Spaced blocks 26 are arranged in pairs and provided on the bars 6 and 11 at opposite sides thereof, the blocks acting as guides or keepers to receive the central transverse bar 13 of the gate proper, to hold the gate in its proper position and at the same time relieve the gate structure of the weight of the gate.

Latch members 27 are provided on the bars 6 and 11 and are designed to move to positions over the central transverse bars 13 of the gate to hold the gate closed. When the gate is inverted, the latch members 28 may be brought into play to fit over the transverse bar 13 falling opposite thereto to secure the gate.

From the foregoing it will be obvious that due to the construction shown and described, the gate may be swung from a position as shown by Figure 1, to a position wherein the ends of the gate may contact with the opposite sides of bar 11 and gate post 6, the gate swinging on the pivot bolt 18.

Should it be desired to invert the gate the bolt 18 may be disconnected and the bracket 16 reversed, whereupon the bolt may again be positioned to support the gate in an elevated position, allowing smaller animals to pass thereunder and at the same time exclude larger animals.

It will further be seen that upon reversing the gate, should the gate, due to sagging be out of alignment so that the central bar 13 will not pass between the blocks 26, the turnbuckle 25 may be operated to raise or lower the gate so that it will properly align.

I claim:

A swinging gate including a stationary gate post and a pivoted gate post, a bar connected with the pivoted gate post, a gate section pivotally supported at the outer end of the bar, said gate section including a substantially central bar, spaced blocks on the movable gate post and stationary gate post, between which the central bar of the gate section moves to support the weight of the gate section, and a latch for holding the gate section against movement.

In testimony that I claim the foregoing as my own, I have hereto affixed my signature.

SYLVESTER G. METZGER.